(12) United States Patent
Iwata et al.

(10) Patent No.: US 12,523,253 B2
(45) Date of Patent: Jan. 13, 2026

(54) LINEAR MOTION GUIDE UNIT

(71) Applicant: NIPPON THOMPSON CO., LTD., Tokyo (JP)

(72) Inventors: Tamotsu Iwata, Mino (JP); Hideyuki Fujii, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 66 days.

(21) Appl. No.: 18/715,829

(22) PCT Filed: Oct. 12, 2022

(86) PCT No.: PCT/JP2022/038084
§ 371 (c)(1),
(2) Date: Jun. 3, 2024

(87) PCT Pub. No.: WO2023/112451
PCT Pub. Date: Jun. 22, 2023

(65) Prior Publication Data
US 2025/0172172 A1    May 29, 2025

(30) Foreign Application Priority Data

Dec. 14, 2021 (JP) .................................. 2021-202322

(51) Int. Cl.
*F16C 29/06* (2006.01)
(52) U.S. Cl.
CPC ...... *F16C 29/0611* (2013.01); *F16C 29/0635* (2013.01); *F16C 29/0654* (2013.01); *F16C 29/0695* (2013.01)

(58) Field of Classification Search
CPC .. F16C 29/06; F16C 29/0611; F16C 29/0635; F16C 29/0638; F16C 29/0652; F16C 29/0654; F16C 29/0695
See application file for complete search history.

(56) References Cited

U.S. PATENT DOCUMENTS

| | | |
|---|---|---|
| 5,800,064 A | 9/1998 | Ohya |
| 8,465,206 B2 * | 6/2013 | Kondo ................ F16C 29/0611 384/45 |
| 11,067,123 B2 * | 7/2021 | Takemura ............. F16C 29/064 |

(Continued)

FOREIGN PATENT DOCUMENTS

| | | |
|---|---|---|
| JP | H09-072335 A | 3/1997 |
| JP | 2009-079776 A | 4/2009 |

(Continued)

OTHER PUBLICATIONS

Dec. 27, 2022 International Search Report issued in International Patent Application No. PCT/JP2022/038084.

*Primary Examiner* — Alan B Waits
(74) *Attorney, Agent, or Firm* — Oliff PLC

(57) ABSTRACT

A linear motion guide unit includes a rail, a slider, and a plurality of balls. The slider includes a coil spring arranged in a first circulation passage so as to extend in a longitudinal direction. The coil spring includes a pair of first regions provided at both ends in the longitudinal direction and fitted in the first circulation passage, and a second region smaller in diameter than the pair of first regions and positioned between the pair of first regions with a gap from an inner wall surface of the first circulation passage.

15 Claims, 10 Drawing Sheets

(56) References Cited

U.S. PATENT DOCUMENTS

| | | | |
|---|---|---|---|
| 2002/0114544 A1* | 8/2002 | Matsui | F16C 29/0657 384/45 |
| 2003/0053724 A1* | 3/2003 | Matsui | F16C 29/0609 384/45 |
| 2012/0051676 A1 | 3/2012 | Kondo et al. | |
| 2015/0219151 A1 | 8/2015 | Kuwabara et al. | |

FOREIGN PATENT DOCUMENTS

| | | |
|---|---|---|
| JP | 2012-047288 A | 3/2012 |
| JP | 2015-143536 A | 8/2015 |

\* cited by examiner

LINEAR MOTION GUIDE UNIT

TECHNICAL FIELD

The present disclosure relates to a linear motion guide unit. The present application claims priority based on Japanese Patent Application No. 2021-202322 filed on Dec. 14, 2021, the entire contents of which are incorporated herein by reference.

BACKGROUND ART

A linear motion rolling guide unit including rolling elements and a slider slidable in the longitudinal direction of a rail is known (see, for example, Patent Literature 1). The linear motion rolling guide unit disclosed in Patent Literature 1 includes return passages for returning the rolling elements to raceway grooves, and turnaround passages for changing the direction of the rolling elements. In the linear motion rolling guide unit disclosed in Patent Literature 1, hollow cylindrical sleeves are fitted in return bores through which the rolling elements pass. The sleeves are provided with slits extending in the longitudinal direction, and are elastically deformable.

CITATION LIST

Patent Literature

Patent Literature 1: Japanese Patent Application Laid-Open No. H09-72335

SUMMARY OF INVENTION

Technical Problem

Linear motion guide units are used in various situations. The slider is required to slide smoothly in any usage situation. Therefore, one of the objects is to provide a linear motion guide unit that facilitates smooth sliding of the slider regardless of the situation in which the unit is used.

Solution to Problem

A linear motion guide unit according to the present disclosure includes: a rail having a pair of first raceway grooves extending parallel to each other in a longitudinal direction; a slider attached to the rail in a relatively movable manner, the slider having a pair of second raceway grooves facing the pair of first raceway grooves, respectively; and a plurality of balls as rolling elements. The rail and the slider form looped paths for the plurality of rolling elements to circulate therethrough. The looped paths include load-carrying races each composed of the first and second raceway grooves, first circulation passages formed in the slider and extending in parallel with the load-carrying races, and pairs of second circulation passages formed in the slider and connecting the load-carrying races with the first circulation passages. The slider includes a coil spring arranged in the first circulation passage so as to extend in the longitudinal direction. The coil spring includes a pair of first regions provided at both ends in the longitudinal direction and fitted in the first circulation passage, and a second region smaller in diameter than the pair of first regions and positioned between the pair of first regions with a gap from an inner wall surface of the first circulation passage.

Advantageous Effects of Invention

The linear motion guide unit described above facilitates smooth sliding of the slider regardless of the situation in which the unit is used.

DESCRIPTION OF EMBODIMENTS

Outline of Embodiments

Figure 1:
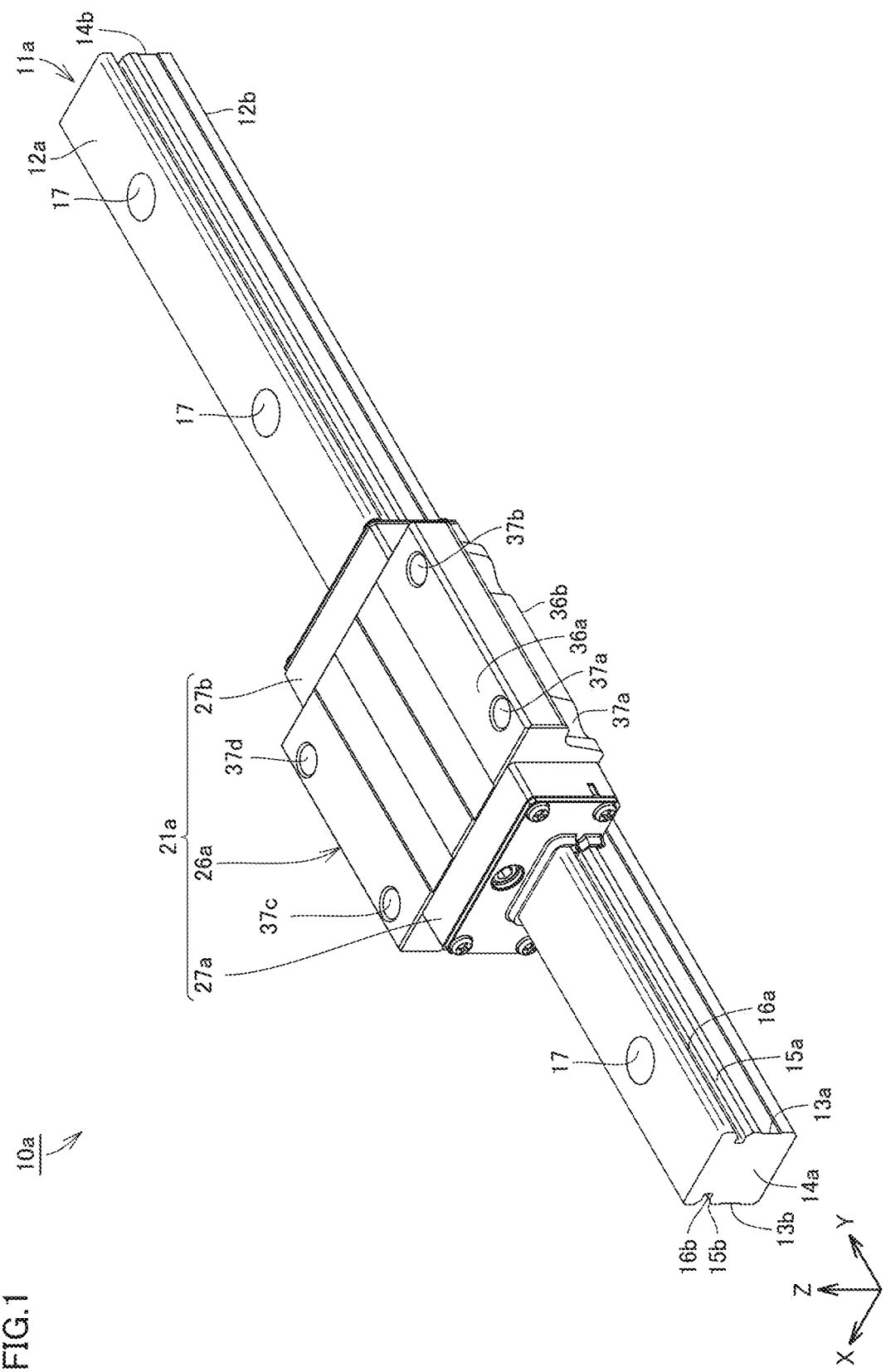
FIG. 1 is a schematic perspective view of a linear motion guide unit in Embodiment 1 of the present disclosure.

A linear motion guide unit of the present disclosure includes: a rail having a pair of first raceway grooves extending parallel to each other in a longitudinal direction; a slider attached to the rail in a relatively movable manner, the slider having a pair of second raceway grooves facing the pair of first raceway grooves, respectively; and a plurality of balls as rolling elements. The rail and the slider form looped paths for the plurality of rolling elements to circulate therethrough. The looped paths include load-carrying races each composed of the first and second raceway grooves, first circulation passages formed in the slider and extending in parallel with the load-carrying races, and pairs of second circulation passages formed in the slider and connecting the load-carrying races with the first circulation passages. The slider includes a coil spring arranged in the first circulation passage so as to extend in the longitudinal direction. The coil spring includes a pair of first regions provided at both ends in the longitudinal direction and fitted in the first circulation passage, and a second region smaller in diameter than the pair of first regions and positioned between the pair of first regions with a gap from an inner wall surface of the first circulation passage.

Linear motion guide units may be used in various situations, specifically, in a posture in which the longitudinal direction of the rail on which the slider slides is horizontal, or in a posture in which the longitudinal direction of the rail is vertical. Of course, smooth sliding of the slider is required in any usage situation.

Here, the present inventors focused on the point that it is difficult for the slider to slide smoothly in the case where the unit is used in a posture in which the longitudinal direction of the rail is vertical, especially when the slider is moved vertically downward. Then, the inventors considered the following. Firstly, when the slider is to be moved vertically upward, the rolling elements move vertically downward in a return passage used when the rolling elements return to the raceway grooves. At this time, the rolling elements naturally fall in the return passage due to their own weight. When the rolling elements are about to enter the raceway grooves, a preload zone where preload is applied, from a turnaround passage, the rolling elements require a force to overcome the frictional resistance as they enter the preload zone. The force required to overcome the frictional resistance is obtained by the rolling elements falling under their own weight when the slider is moved vertically upward. On the other hand, when the slider is to be moved vertically downward, the rolling elements move vertically upward in the return passage. At this time, the rolling elements in the return passage push each other in the vertical direction from the lower side to the upper side, and they are in a so-called staggered position in which the directions in which they are pushed are not fixed. In this case, the rolling elements are unable to obtain the force required to overcome the frictional resistance as they enter the preload zone. As a result, the rolling elements are caught and jammed at the position where they enter the preload zone. The inventors have found that this hinders the smooth sliding of the slider.

Under these circumstances, the present inventors have made intensive studies and arrived at the following idea. In the linear motion guide unit of the present disclosure, in order to suppress the occurrence of a jammed state of the rolling elements caught at the position where they enter the preload zone, it has been decided to adopt the configuration in which the slider includes a coil spring arranged in the first circulation passage so as to extend in the longitudinal direction. This coil spring has been configured to include a pair of first regions provided at both ends in the longitudinal direction and fitted in the first circulation passage, and a second region smaller in diameter than the pair of first regions and positioned between the pair of first regions with a gap from the inner wall surface of the first circulation passage. According to these configurations, firstly, the first regions are fitted in the first circulation passage, so that when the rolling elements are to move from the second circulation passages to the first circulation passage, the steps can be reduced to allow the rolling elements to move smoothly from the second circulation passages to the first circulation passage. Furthermore, when the rolling elements are to enter the preload zone, the frictional resistance generated when they enter the preload zone can be absorbed by elastic deformation of the coil spring utilizing the gap provided between the inner wall surface of the first circulation passage and the second region in the first circulation passage. In other words, when the rolling elements are in a staggered position and the directions in which they are pushed are not fixed, the elastic deformation of the coil spring in the radial direction in the second region provided with the gap can alleviate the instantaneous increase in resistance caused by being pushed by the rolling element coming out of the preload zone. Therefore, the force required to overcome the significant frictional resistance is no longer necessary, and the occurrence of a jammed state caused by the rolling elements being caught can be suppressed. As a result, even in the case where the slider is moved vertically upward, the jammed state of the rolling elements in the first circulation passage can be avoided, thereby facilitating the smooth sliding of the slider.

Furthermore, the linear motion guide unit of the present disclosure enables lubricating oil to be supplied to the rolling elements from the gap of the coil spring over the entire longitudinal direction of the coil spring. Thus, smooth supply of lubricating oil to the rolling elements is also ensured.

From the above, the linear motion guide unit of the present disclosure facilitates smooth sliding of the slider regardless of the situation in which the unit is used.

In the above linear motion guide unit, the coil spring may be made of a metal. There are cases where the above linear motion guide unit is used in an extremely high temperature environment. With this configuration, the coil spring made of a metal can be adopted to ensure smooth sliding of the slider even in a high-temperature operating environment where it is particularly difficult to use a spring made of a resin.

In the above linear motion guide unit, the pair of first regions may be formed by enlarging the diameter of the coil spring. Such a coil spring can be produced by preparing a coil spring having a constant diameter in the longitudinal direction and enlarging the diameter at both ends to form the first regions. Thus, the productivity can be improved.

In the above linear motion guide unit, the coil spring may have a length equal to a length of the first circulation passage. This ensures a smoother movement of the rolling elements to the second circulation passages connected to the first circulation passage.

In the above linear motion guide unit, the rail may include a first rail side surface and a second rail side surface that extend parallel to each other along the longitudinal direction. The slider may be straddled on the rail. One of the first raceway grooves may be provided on the first rail side surface. The other of the first raceway grooves may be provided on the second rail side surface. Such a linear motion guide unit is suitable for use in machine tools, assembly devices, conveying machines, and the like.

In the above linear motion guide unit, the rail may be a solid cylindrical splined shaft. The slider may have a hollow cylindrical shape and may be arranged on an outer peripheral side of the rail. The pair of first raceway grooves extending parallel to each other in the longitudinal direction may be provided on an outside diameter surface of the rail. Such a linear motion guide unit is capable of simultaneously receiving a torque in addition to a radial load. Thus, the unit can be effectively utilized when a radial load and a torque are generated.

SPECIFIC EMBODIMENTS

Specific embodiments of the linear motion guide unit of the present disclosure will be described below with reference to the drawings. In the drawings referenced below, the same or corresponding portions are denoted by the same reference numerals and the description thereof will not be repeated.

Embodiment 1

Figure 2:
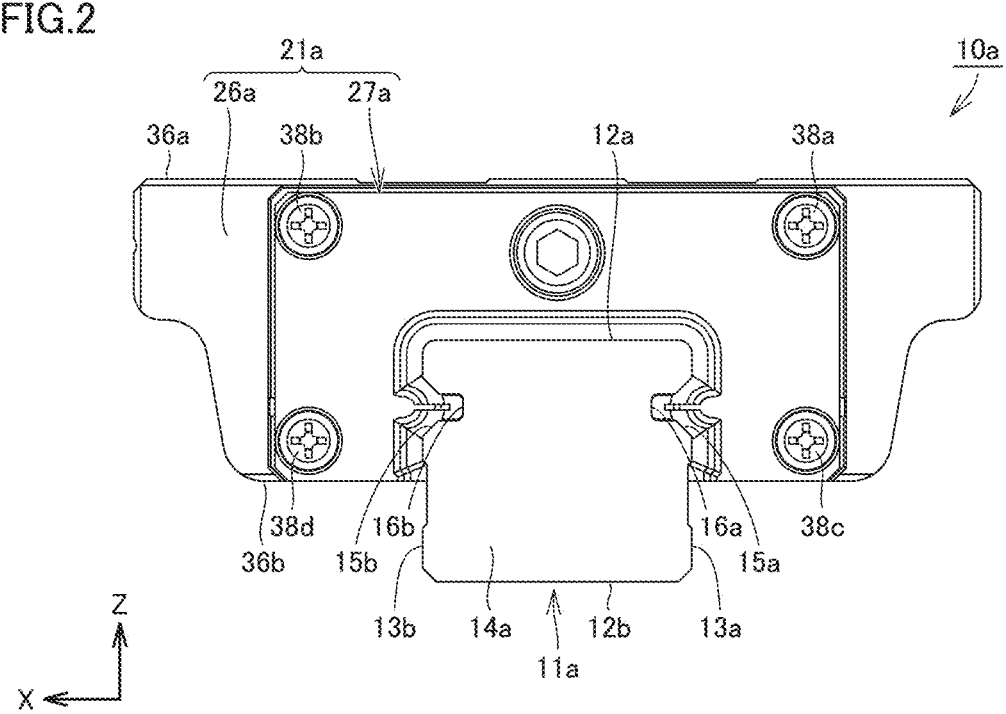
FIG. 2 is a schematic side view of the linear motion guide unit shown in FIG. 1.
Figure 3:
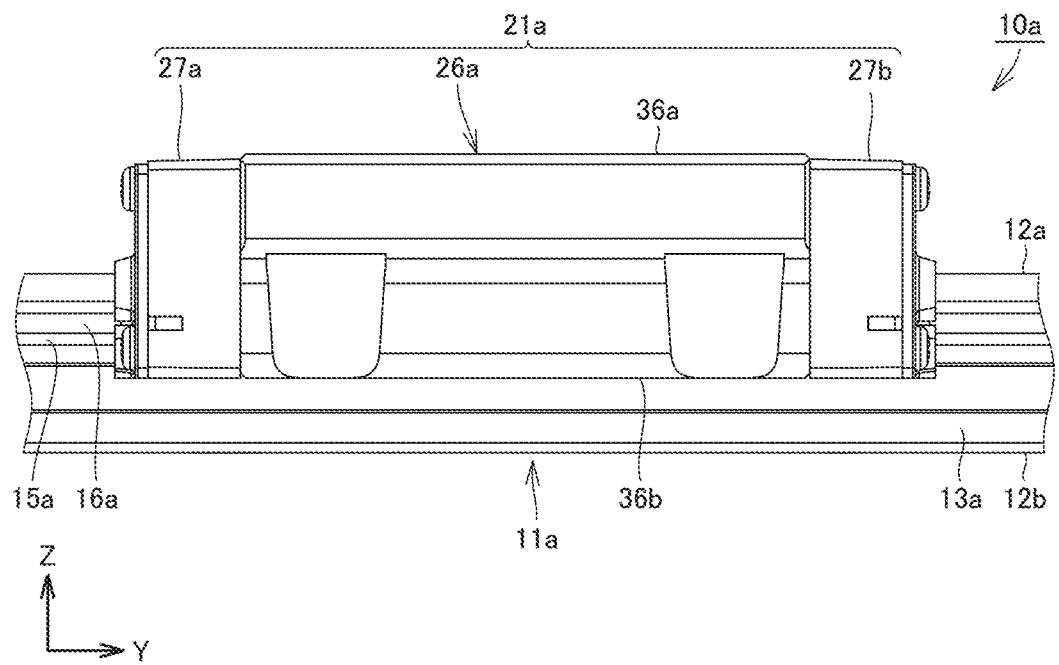
FIG. 3 is a schematic side view of a portion of the linear motion guide unit shown in FIG. 1.
Figure 4:
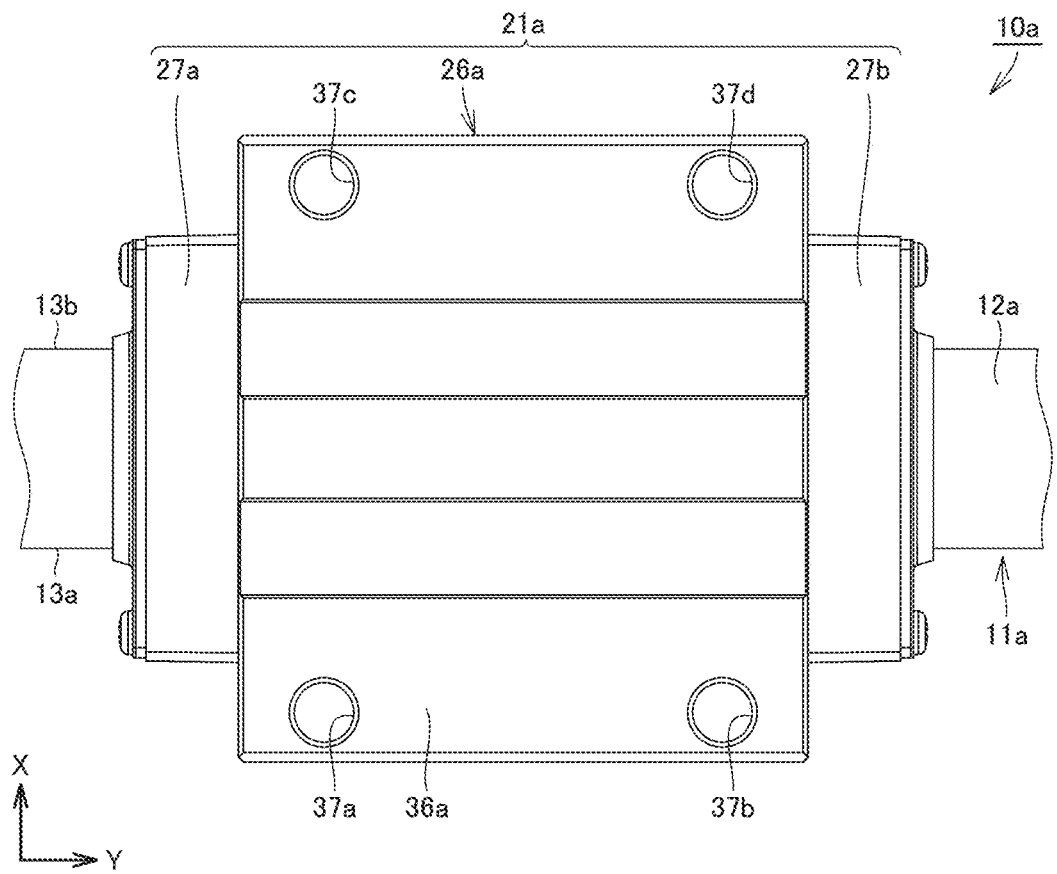
FIG. 4 is a schematic plan view of a portion of the linear motion guide unit shown in FIG. 1.
Figure 5:
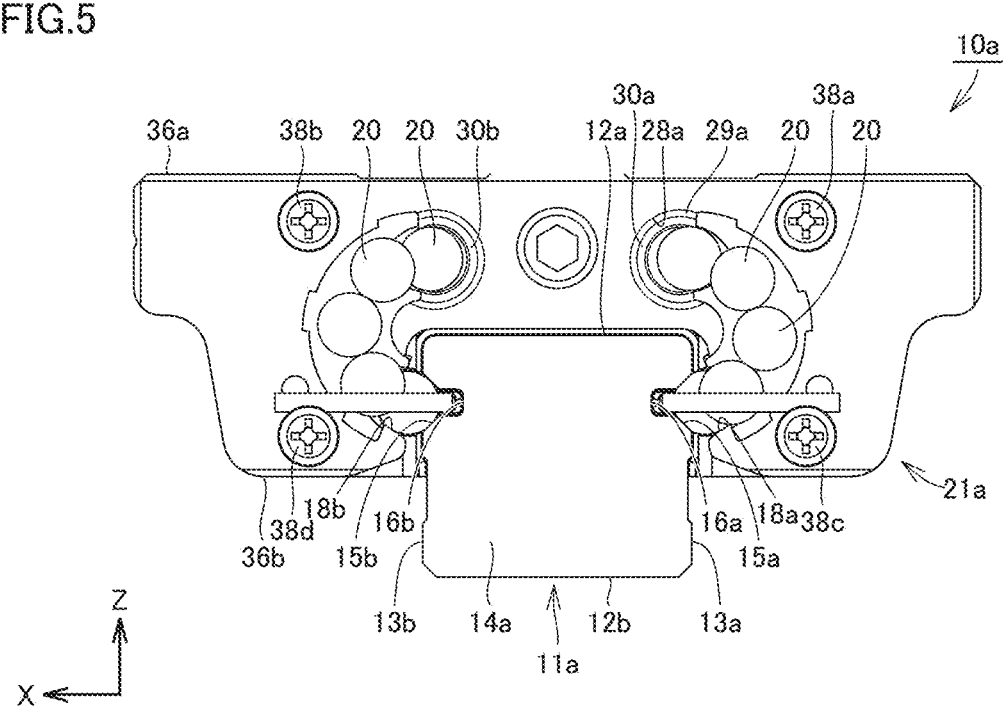
FIG. 5 is a schematic side view of the linear motion guide unit shown in FIG. 1, with one end cap, the first end cap, removed.
Figure 6:
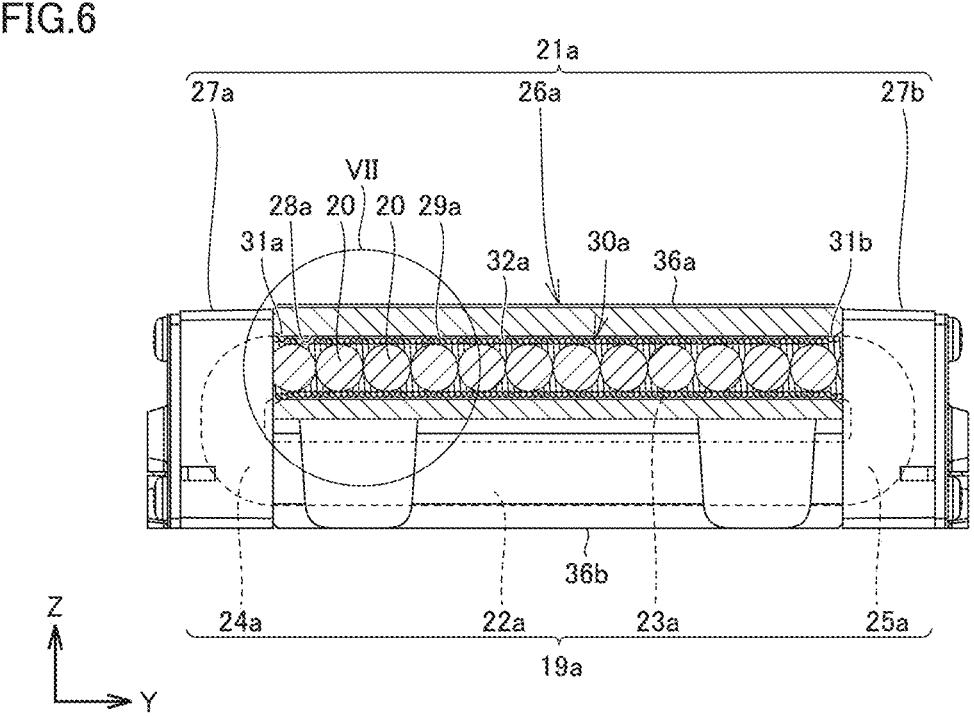
FIG. 6 is a schematic cross-sectional view of a portion of a slider.
Figure 7:
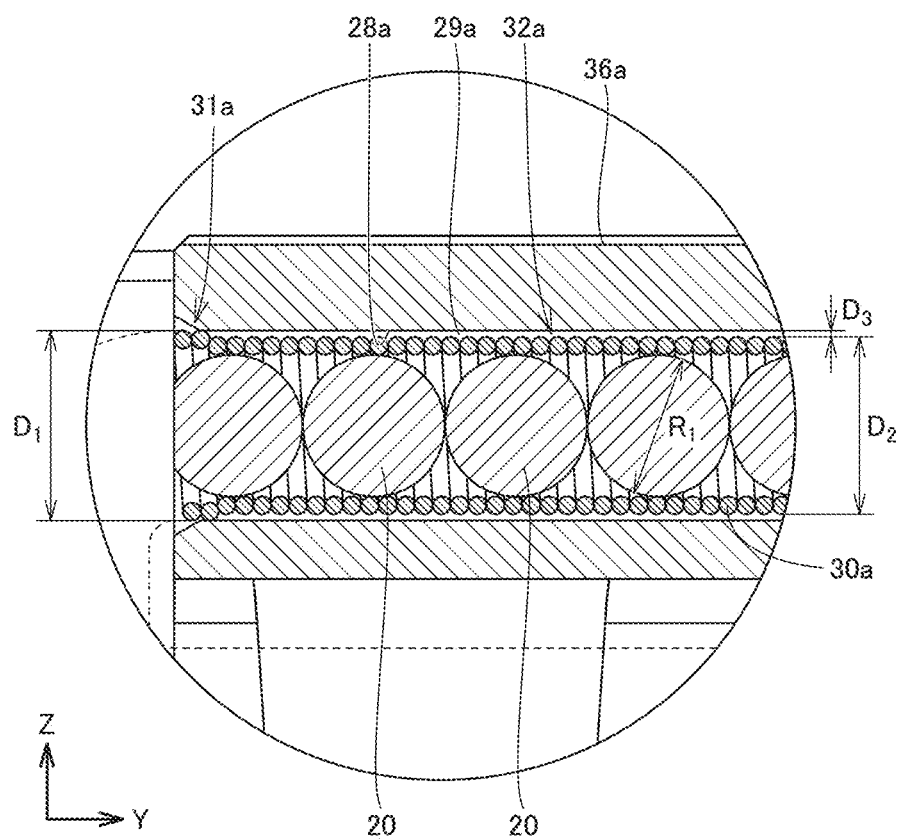
FIG. 7 is an enlarged view of the area indicated by VII in FIG. 6.

One embodiment of the present disclosure, Embodiment 1, will be described first. FIG. 1 is a schematic perspective view of a linear motion guide unit in Embodiment 1 of the present disclosure. FIG. 2 is a schematic side view of the linear motion guide unit shown in FIG. 1. FIG. 2 is a view of the linear motion guide unit shown in FIG. 1 in the direction indicated by the arrow Y. FIG. 3 is a schematic side view of a portion of the linear motion guide unit shown in FIG. 1. FIG. 3 is a view of the linear motion guide unit shown in FIG. 1 in the direction indicated by the arrow X. FIG. 4 is a schematic plan view of a portion of the linear motion guide unit shown in FIG. 1. FIG. 4 is a view of the linear motion guide unit shown in FIG. 1 in the direction opposite to the direction indicated by the arrow Z. FIG. 5 is a schematic side view of the linear motion guide unit shown in FIG. 1, with one end cap, the first end cap described later, removed. As in FIG. 2, FIG. 5 is a view in the direction indicated by the arrow Y. FIG. 6 is a schematic cross-sectional view of a portion of a slider, described later. FIG. 7 is an enlarged view of the area indicated by VII in FIG. 6. In FIGS. 6 and 7, balls, described later, are illustrated for ease of understanding. In FIG. 1 and the following figures, the X direction indicates the lateral direction, which is the width direction of the linear motion guide unit, the Y direction indicates the longitudinal direction of the linear motion guide unit, and the Z direction indicates the thickness direction (height direction) of the linear motion guide unit. The X, Y, and Z directions are orthogonal to each other.

Referring to FIGS. 1, 2, 3, 4, 5, 6, and 7, the linear motion guide unit 10a according to Embodiment 1 of the present disclosure includes a rail 11a as a shaft, a slider 21a, and a plurality of balls 20 as the rolling elements. The rail 11a is configured to extend straight in the longitudinal direction, the Y direction. The linear motion guide unit 10a according to Embodiment 1 is simplified in its configuration by including the balls 20 as the rolling elements.

The configuration of the rail 11a will be described first. The rail 11a includes a rail upper end surface 12a and a rail lower end surface 12b spaced apart in the Z direction, a first rail side surface 13a and a second rail side surface 13b spaced apart in the X direction, and a rail front end surface 14a and a rail rear end surface 14b spaced apart in the Y direction. In other words, the rail 11a includes the first rail side surface 13a and the second rail side surface 13b extending parallel to each other along the longitudinal direction. The rail 11a has a pair of first raceway grooves 15a and 15b extending parallel to each other in the longitudinal direction. The first raceway groove 15a is provided on the first rail side surface 13a. The first raceway groove 15b is provided on the second rail side surface 13b. The first raceway grooves 15a and 15b are provided on the first rail side surface 13a and the second rail side surface 13b, respectively, so as to be concaved inwardly of the rail 11a to form semicircular arc-shaped concave grooves. The first rail side surface 13a and the second rail side surface 13b are provided with recesses 16a and 16b, respectively, which are further concaved inwardly in the central portions in the Z direction of the first raceway grooves 15a and 15b. The linear motion guide unit 10a including such a rail 11a is suitable for use in machine tools, assembly devices, conveying machines, and the like.

The rail 11a has a plurality of through holes 17 provided to penetrate in the Z direction from the rail upper end surface 12a to the rail lower end surface 12b. The plurality of through holes 17 are spaced apart in the Y direction. The through holes 17 are effectively utilized at the time of use of the linear motion guide unit 10a, for example, to mount the rail 11a at a predetermined location.

The configuration of the slider 21a will now be described. The slider 21a is attached to the rail 11a in a relatively movable manner. In the present embodiment, the slider 21a is slidably straddled on the rail 11a. In other words, the slider 21a is attached so as to straddle the rail 11a and is movable in the Y direction.

The slider 21a has a pair of second raceway grooves 18a and 18b facing the pair of first raceway grooves 15a and 15b, respectively. The rail 11a and the slider 21a form a looped path 19a through which the balls 20 circulate. The looped path 19a includes a load-carrying race 22a composed of the first raceway groove 15a and the second raceway groove 18a, a first circulation passage 23a formed in the slider 21a and extending in parallel with the load-carrying race 22a, and a pair of second circulation passages 24a and 25a formed in the slider 21a and connecting the load-carrying race 22a with the first circulation passage 23a. The first circulation passage 23a is also called a return passage. The pair of second circulation passages 24a and 25a are also called turnaround passages. The load-carrying race 22a is a preload zone where preload is applied. The first circulation passage 23a and the second circulation passages 24a and 25a are non-loaded races where no load is applied. Another looped path including a load-carrying race composed of the first raceway groove 15b and the second raceway groove 18b has the same configuration as above. The same applies to the following configurations.

The slider 21a includes a carriage 26a and a pair of end caps 27a and 27b. The carriage 26a and the end cap 27a are connected by a plurality of screws 38a, 38b, 38c, and 38d. Similarly, the carriage 26a and the end cap 27b are connected by a plurality of screws. The carriage 26a has four through holes 37a, 37b, 37c, and 37d provided to penetrate from an upper surface 36a to a lower surface 36b.

The carriage 26a has the first circulation passage 23a provided therein. The carriage 26a also includes the second raceway grooves 18a and 18b. The first end cap 27a is disposed on one side of the carriage 26a in the longitudinal direction. In the present embodiment, the first end cap 27a is disposed on the rail front end surface 14a side in the longitudinal direction. The first end cap 27a has one second circulation passage 24a provided therein. The second end cap 27b is disposed on the other side of the carriage 26a in the longitudinal direction. In the present embodiment, the second end cap 27b is disposed on the rail rear end surface 14b side in the longitudinal direction. The second end cap 27b has the other second circulation passage 25a provided therein.

The further detailed configuration of the slider 21a will now be described. The slider 21a includes a coil spring 30a disposed in the first circulation passage 23a so as to extend in the longitudinal direction. The slider 21a also includes a coil spring 30b disposed in a first circulation passage that is included in the looped path including the load-carrying race composed of the first raceway groove 15b and the second raceway groove 18b so as to extend in the longitudinal direction. The configuration of the coil spring 30b is the same as that of the coil spring 30a, so the description thereof will not be repeated.

Figure 8:
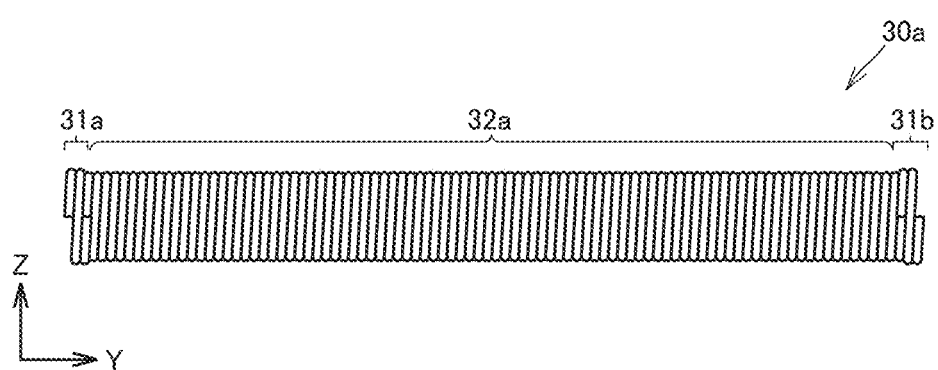
FIG. 8 is a schematic side view of a coil spring.

FIG. 8 is a schematic side view of the coil spring 30a. Referring also to FIG. 8, the coil spring 30a is made of a metal and is a tensile coil spring. The coil spring 30a has a length equal to the length of the first circulation passage 23a. The coil spring 30a has an annular shape and allows the balls 20 having a diameter $R_1$ to pass through the interior thereof. The coil spring 30a includes a pair of first regions 31a and 31b and a second region 32a. The pair of first regions 31a and 31b are provided at respective ends in the longitudinal direction and are fitted in the first circulation passage 23a. In the present embodiment, the first regions 31a and 31b are each fitted in the first circulation passage 23a in a clearance fit. The second region 32a has a diameter $D_2$ smaller than a diameter $D_1$ of the pair of first regions 31a and 31b and is positioned between the pair of first regions 31a and 31b with a gap 29a from an inner wall surface 28a of the first circulation passage 23a, 23b. The pair of first regions 31a and 31b are formed by enlarging the diameter of the coil spring 30a. The size of the gap 29a is indicated by a spacing $D_3$. In the present embodiment, the coil spring 30a is in one piece.

According to the linear motion guide unit 10a described above, firstly, the first regions 31a and 31b are fitted in the first circulation passage 23a, so that when the balls 20 are to move from the second circulation passages 24a and 25a to the first circulation passage 23a, the steps can be reduced to allow the balls 20 to move smoothly from the second circulation passages 24a and 25a to the first circulation passage 23a. Furthermore, when the balls 20 are to enter the preload zone, the coil spring 30a can be elastically deformed by utilizing the gap 29a between the inner wall surface 28a of the first circulation passage 23a and the second region 32a in the first circulation passage 23a, thereby absorbing frictional resistance generated when the balls 20 enter the preload zone. In other words, when the balls 20 are in a staggered position and the directions in which they are pushed are not fixed, the elastic deformation of the coil spring 30a in the radial direction in the second region 32a where the gap 29a is provided can alleviate the instantaneous increase in resistance caused by being pushed by the ball 20 coming out of the preload zone. Therefore, the force required to overcome the significant frictional resistance is no longer necessary, and thus the occurrence of a jammed state caused by the balls 20 being caught can be suppressed. As a result, even in the case where the slider 21a is moved vertically upward, the jammed state of the balls 20 in the first circulation passage 23a can be avoided, thereby facilitating the smooth sliding of the slider 21a.

Further, in the linear motion guide unit 10a above, it is possible to supply lubricating oil to the balls 20 from the gap of the coil spring 30a over the entire longitudinal direction of the coil spring 30a. Therefore, the supply of lubricating oil to the balls 20 can also be performed smoothly.

From the above, the linear motion guide unit 10a of the present disclosure facilitates smooth sliding of the slider 21a regardless of the situation in which the unit is used.

In the present embodiment, the coil spring is made of a metal. Thus, the coil spring 30a can be adopted to ensure smooth sliding of the slider 21a even in a high-temperature operating environment where it is particularly difficult to use a spring made of a resin.

In the present embodiment, the pair of first regions 31a and 31b are formed by enlarging the diameter of the coil spring 30a. Such a coil spring 30a can be produced by preparing a coil spring 30a having a constant diameter in the longitudinal direction and enlarging the diameter at both ends to form the first regions 31a and 31b. Thus, the productivity can be improved.

In the present embodiment, the coil spring 30a has a length equal to the length of the first circulation passage 23a. This allows the balls 20 to move more smoothly to the second circulation passages 24a and 25a connected to the first circulation passage 23a.

Embodiment 2

Figure 9:
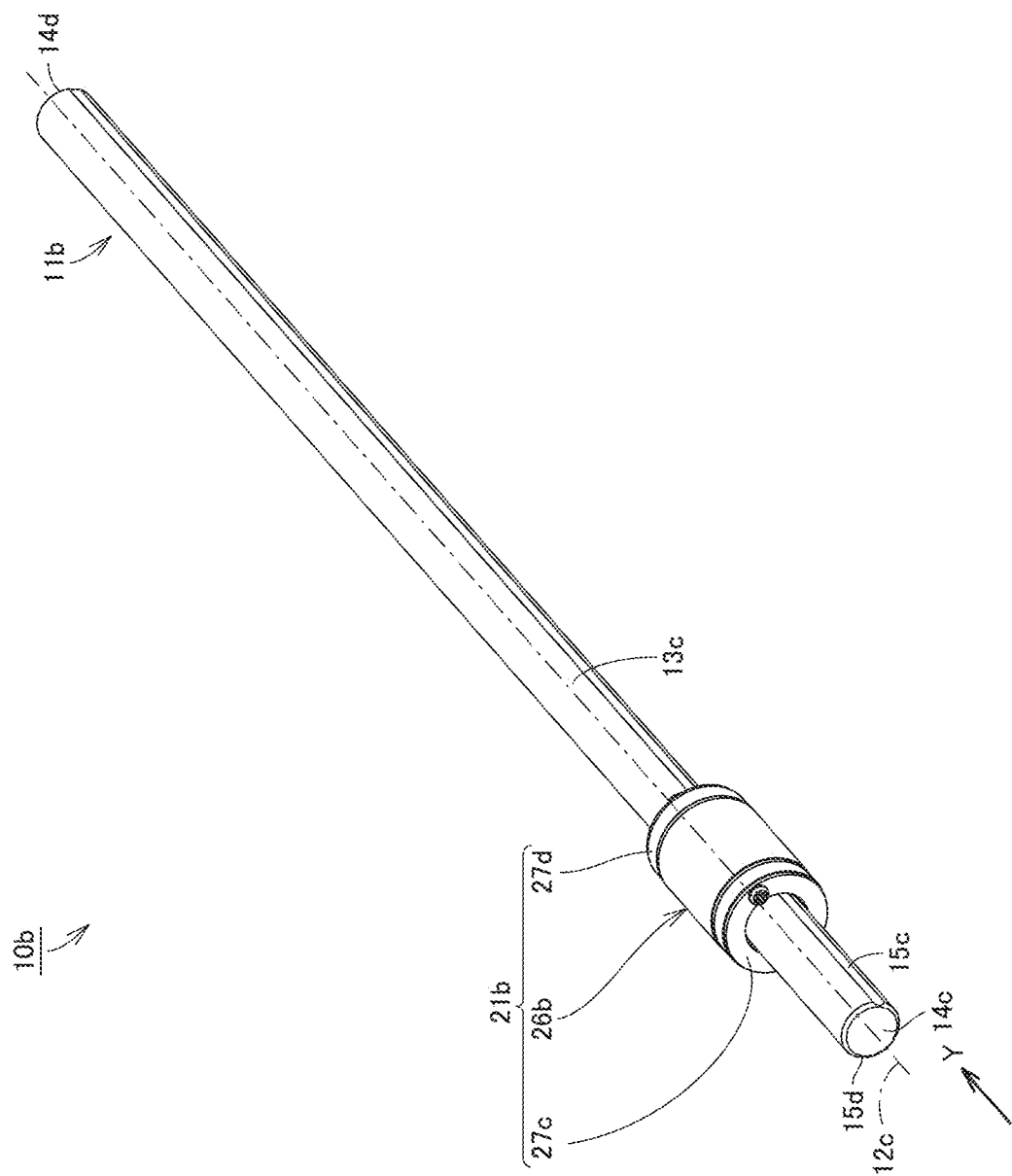
FIG. 9 is a schematic perspective view of a linear motion guide unit in Embodiment 2 of the present disclosure.
Figure 10:
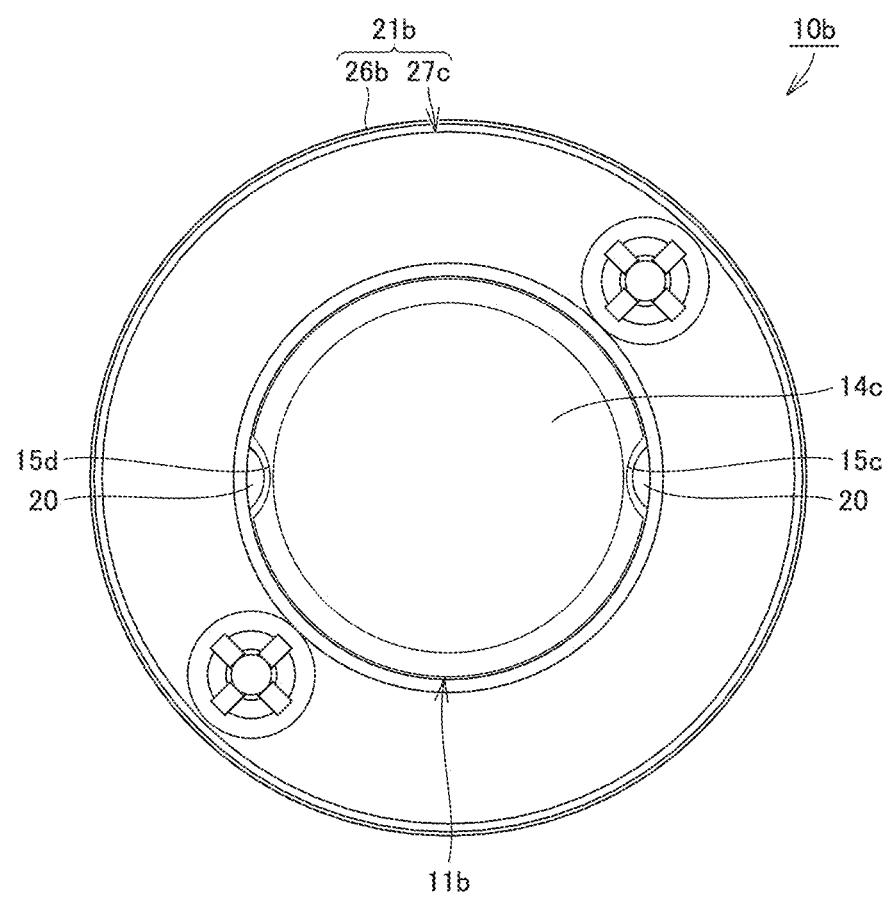
FIG. 10 is a schematic side view of the linear motion guide unit shown in FIG. 9.
Figure 11:
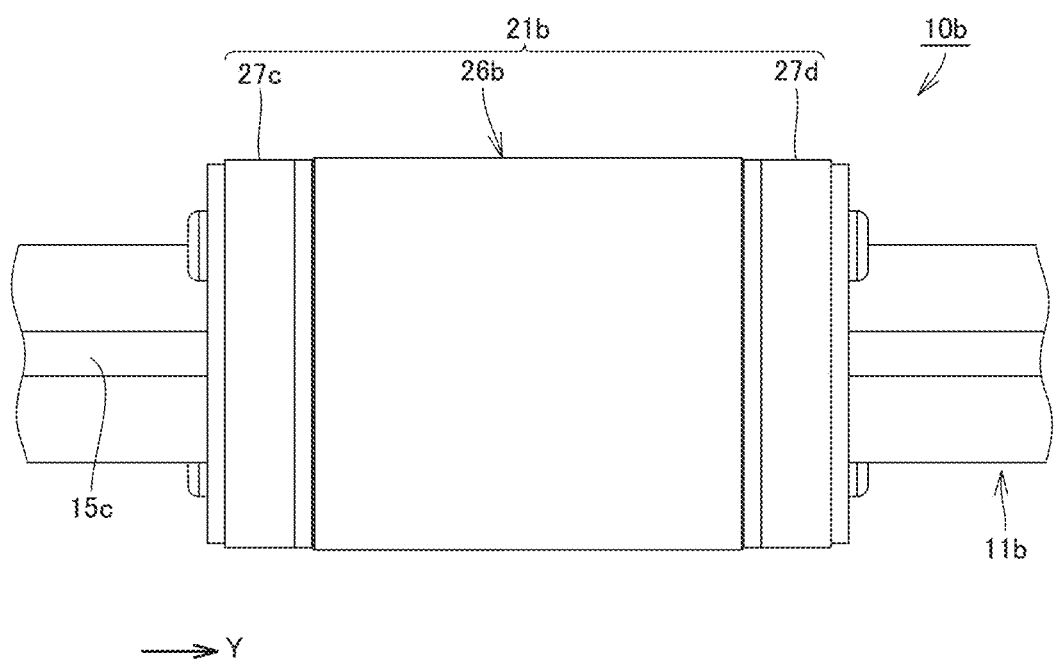
FIG. 11 is a schematic side view of a portion of the linear motion guide unit shown in FIG. 9.
Figure 12:
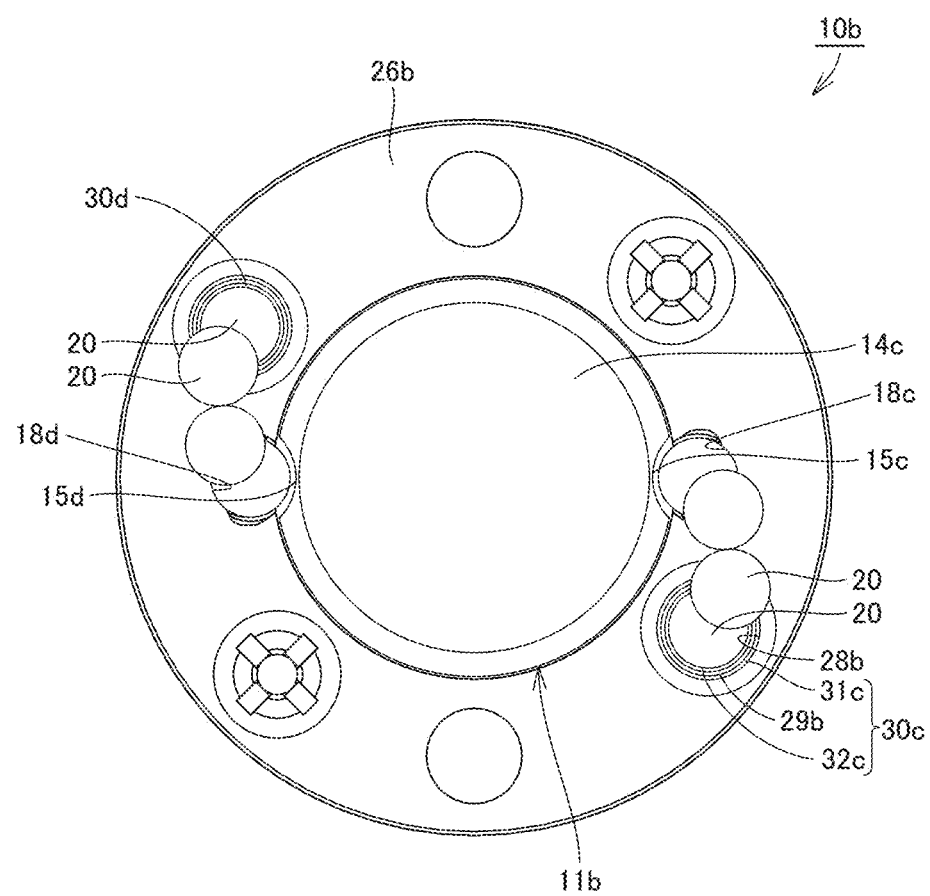
FIG. 12 is a schematic side view of the linear motion guide unit shown in FIG. 9, with one end cap, the first end cap, removed.
Figure 13:
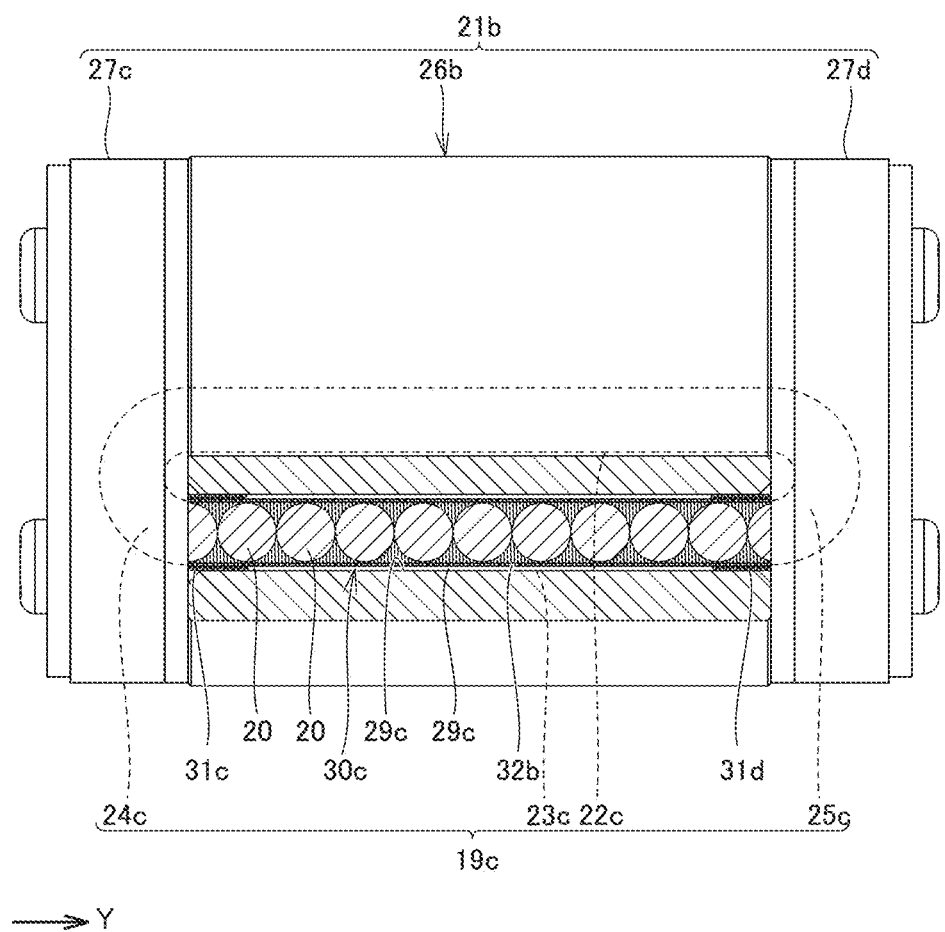
FIG. 13 is a schematic cross-sectional view of a portion of a slider.

Another embodiment, Embodiment 2, will now be described. FIG. 9 is a schematic perspective view of a linear motion guide unit in Embodiment 2 of the present disclosure. FIG. 10 is a schematic side view of the linear motion guide unit shown in FIG. 9. FIG. 10 is a view of the linear motion guide unit shown in FIG. 9 in the direction indicated by the arrow Y. FIG. 11 is a schematic side view of a portion of the linear motion guide unit shown in FIG. 9. FIG. 11 is a view of the linear motion guide unit shown in FIG. 9 from the outside diameter side of the rail. FIG. 12 is a schematic side view of the linear motion guide unit shown in FIG. 9, with one end cap, the first end cap, removed. As in FIG. 10, FIG. 12 is a view in the direction indicated by the arrow Y. FIG. 13 is a schematic cross-sectional view of a portion of a slider. In FIG. 13, balls are illustrated for ease of understanding. The linear motion guide unit of Embodiment 2 basically has a similar configuration and provides similar effects as in the case of Embodiment 1. However, the linear motion guide unit of Embodiment 2 differs from the case of Embodiment 1 in terms of the configurations of the rail and the slider.

Referring to FIGS. 9, 10, 11, 12, and 13, the linear motion guide unit 10b in Embodiment 2 includes a rail 11b, a slider 21b, and a plurality of balls 20 as the rolling elements. The rail 11b is configured to extend straight in the longitudinal direction, the Y direction. Similar to the linear motion guide unit 10a of Embodiment 1, the linear motion guide unit 10b of Embodiment 2 is simplified in its configuration by including the balls 20 as the rolling elements.

The rail 11b has a pair of first raceway grooves 15c and 15d extending parallel to each other in the longitudinal direction. In the present embodiment, the rail 11b is a solid cylindrical splined shaft. The rail 11b has an outside diameter surface 13c on which the pair of first raceway grooves 15c and 15d are provided to extend parallel to each other in the longitudinal direction. As viewed from the longitudinal direction, with respect to the position where one first raceway groove 15c is provided, the other first raceway groove 15d is provided at a position 180 degrees rotated with the center of the rail 11b as a rotational center axis 12c. The rotational center axis 12c is indicated by a long dashed short dashed line in FIG. 9.

The slider 21b is attached to the rail 11b in a relatively movable manner. In the present embodiment, the slider 21b has a hollow cylindrical shape. The slider 21b is arranged on the outer peripheral side of the rail 11b.

The rail 11b has a pair of second raceway grooves 18c and 18d facing the pair of first raceway grooves 15c and 15d, respectively. The rail 11b and the slider 21b form a looped path 19c through which the balls 20 circulate. The looped path 19c includes a load-carrying race 22c composed of the first raceway groove 15c and the second raceway groove 18c, a first circulation passage 23c formed in the slider 21b and extending in parallel with the load-carrying race 22c, and a pair of second circulation passages 24c and 25c formed in the slider 21b and connecting the load-carrying race 22c with the first circulation passage 23c. Another looped path including a load-carrying race composed of the first raceway groove 15d and the second raceway groove 18d has the same configuration as above. The same applies to the following configurations.

The slider 21b includes an outer casing 26b and a pair of end caps 27c and 27d. The outer casing 26b has the first circulation passage 23c provided therein. The outer casing 26b also includes the second raceway grooves 18c and 18d. The first end cap 27c is disposed on one side of the outer casing 26b in the longitudinal direction. In the present embodiment, the first end cap 27c is disposed on a rail front end surface 14c side in the longitudinal direction. The first end cap 27*c* has one second circulation passage 24*c* provided therein. The second end cap 27*d* is disposed on the other side of the outer casing 26*b* in the longitudinal direction. In the present embodiment, the second end cap 27*d* is disposed on a rail rear end surface 14*d* side in the longitudinal direction. The second end cap 27*d* has the other second circulation passage 25*c* provided therein.

The further detailed configuration of the slider 21*b* will now be described. The slider 21*b* includes a coil spring 30*c* disposed in the first circulation passage 23*c* so as to extend in the longitudinal direction. The slider 21*b* also includes a coil spring 30*d* disposed in a first circulation passage that is included in the looped path including the load-carrying race composed of the first raceway groove 15*d* and the second raceway groove 18*d* so as to extend in the longitudinal direction. The configuration of the coil spring 30*d* is the same as that of the coil spring 30*c*, so the description thereof will not be repeated.

The coil spring 30*c* is made of a metal and is a tensile coil spring. The coil spring 30*c* has a length equal to the length of the first circulation passage 23*c*. The coil spring 30*c* has an annular shape and allows the balls 20 having a diameter $R_1$ to pass through the interior thereof. The coil spring 30*c* includes a pair of first regions 31*c* and 31*d* and a second region 32*b*. The pair of first regions 31*c* and 31*d* are provided at respective ends in the longitudinal direction and are fitted in the first circulation passage 23*c*. In the present embodiment, the first regions 31*c* and 31*d* are each fitted in the first circulation passage 23*c* in a clearance fit. The second region 32*b* is smaller in diameter than the pair of first regions 31*c* and 31*d* and is positioned between the pair of first regions 31*c* and 31*d* with a gap 29*b* from an inner wall surface 28*b* of the first circulation passage 23*c*. The pair of first regions 31*c* and 31*d* are formed by enlarging the diameter of the coil spring 30*c*. In the present embodiment, the coil spring 30*c* is in one piece. Other configurations of the coil spring 30*c* are the same as those of the coil springs 30*a* and 30*b* in Embodiment 1, so the description thereof will not be repeated.

In such a linear motion guide unit 10*b* as well, it is easy to slide the slider 21*b* smoothly regardless of the situation in which the unit is used, because it includes the coil springs 30*c* and 30*d* with the above configurations. Such a linear motion guide unit 10*b* is capable of simultaneously receiving a torque in addition to a radial load. Thus, the unit can be effectively utilized when a radial load and a torque are generated.

Other Embodiments

While the length of the coil spring is equal to the length of the first circulation passage in the above embodiments, the present invention is not limited thereto. The length of the coil spring may be different from the length of the first circulation passage. For example, the length of the coil spring may be less than the length of the first circulation passage. In this case, at least one of the first regions is located in the first circulation passage. In the area where the coil spring is not disposed, the rolling elements will move while in contact with the inner wall surface of the first circulation passage. Alternatively, a coil spring with a length greater than the length of the first circulation passage may be adopted. In this case, the coil spring is located in a part of the second circulation passage or in the entire second circulation passage. Since the coil spring is elastically deformable, it can be easily placed even in a second circulation passage configured in a folded manner.

Further, while the pair of first regions are formed by enlarging the diameter of the coil spring in the above embodiments, the present invention is not limited thereto. Coil springs of different diameters may be joined together to form the above-described coil spring including the pair of first regions and the second region.

While the coil spring is made of a metal in the above embodiments, not limited thereto, the coil spring may be made of a resin. Specifically, one made of an engineering plastic, for example, is used.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

10*a*, 10*b*: linear motion guide unit; 11*a*, 11*b*: rail; 12*a*: rail upper end surface; 12*b*: rail lower end surface; 12*c*: rotational center axis; 13*a*: first rail side surface; 13*b*: second rail side surface; 13*c*: outside diameter surface; 14*a*, 14*c*: rail front end surface; 14*b*, 14*d*: rail rear end surface; 15*a*, 15*b*, 15*c*, 15*d*: first raceway groove; 16*a*, 16*b*: recess; 17, 37*a*, 37*b*, 37*c*, 37*d*: through hole; 18*a*, 18*b*, 18*c*, 18*d*: second raceway groove; 19*a*, 19*c*: looped path; 20: ball; 21*a*, 21*b*: slider; 22*a*, 22*c*: load-carrying race; 23*a*, 23*b*, 23*c*: first circulation passage; 24*a*, 24*c*, 25*a*, 25*c*: second circulation passage; 26*a*, 26*b*: outer casing; 27*a*, 27*c*: end cap (first end cap); 27*b*, 27*d*: end cap (second end cap); 28*a*, 28*b*: inner wall surface; 29*a*, 29*b*: gap; 30*a*, 30*b*, 30*c*, 30*d*: coil spring; 31*a*, 31*b*, 31*c*, 31*d*: first region; 32*a*, 32*b*: second region; 36*a*: upper surface; 36*b*: lower surface; and 38*a*, 38*b*, 38*c*, 38*d*: screw.

The invention claimed is:

1. A linear motion guide unit comprising:
a rail having a pair of first raceway grooves extending parallel to each other in a longitudinal direction;
a slider attached to the rail in a relatively movable manner, the slider having a pair of second raceway grooves facing the pair of first raceway grooves, respectively; and
a plurality of balls as rolling elements;
the rail and the slider forming looped paths for the plurality of rolling elements to circulate therethrough, the looped paths including
load-carrying races each composed of the first and second raceway grooves,
first circulation passages formed in the slider and extending in parallel with the load-carrying races, and
pairs of second circulation passages formed in the slider and connecting the load-carrying races with the first circulation passages,
the slider including a coil spring arranged in the first circulation passage so as to extend in the longitudinal direction,
the coil spring including
a pair of first regions provided at both ends in the longitudinal direction and fitted in the first circulation passage, and
a second region smaller in diameter than the pair of first regions and positioned between the pair of first regions with a gap from an inner wall surface of the first circulation passage.

2. The linear motion guide unit according to claim 1, wherein the coil spring is made of a metal.

3. The linear motion guide unit according to claim 2, wherein the pair of first regions are formed by enlarging a diameter of the coil spring.

4. The linear motion guide unit according to claim 2, wherein the coil spring has a length equal to a length of the first circulation passage.

5. The linear motion guide unit according to claim 2, wherein
the rail includes a first rail side surface and a second rail side surface extending parallel to each other along the longitudinal direction,
the slider is straddled on the rail,
one of the first raceway grooves is provided on the first rail side surface, and
the other of the first raceway grooves is provided on the second rail side surface.

6. The linear motion guide unit according to claim 2, wherein
the rail is a solid cylindrical splined shaft,
the slider has a hollow cylindrical shape and is arranged on an outer peripheral side of the rail, and
the pair of first raceway grooves extending parallel to each other in the longitudinal direction are provided on an outside diameter surface of the rail.

7. The linear motion guide unit according to claim 1, wherein the pair of first regions are formed by enlarging a diameter of the coil spring.

8. The linear motion guide unit according to claim 7, wherein the coil spring has a length equal to a length of the first circulation passage.

9. The linear motion guide unit according to claim 7, wherein
the rail includes a first rail side surface and a second rail side surface extending parallel to each other along the longitudinal direction,
the slider is straddled on the rail,
one of the first raceway grooves is provided on the first rail side surface, and
the other of the first raceway grooves is provided on the second rail side surface.

10. The linear motion guide unit according to claim 7, wherein
the rail is a solid cylindrical splined shaft,
the slider has a hollow cylindrical shape and is arranged on an outer peripheral side of the rail, and
the pair of first raceway grooves extending parallel to each other in the longitudinal direction are provided on an outside diameter surface of the rail.

11. The linear motion guide unit according to claim 1, wherein the coil spring has a length equal to a length of the first circulation passage.

12. The linear motion guide unit according to claim 11, wherein
the rail includes a first rail side surface and a second rail side surface extending parallel to each other along the longitudinal direction,
the slider is straddled on the rail,
one of the first raceway grooves is provided on the first rail side surface, and
the other of the first raceway grooves is provided on the second rail side surface.

13. The linear motion guide unit according to claim 11, wherein
the rail is a solid cylindrical splined shaft,
the slider has a hollow cylindrical shape and is arranged on an outer peripheral side of the rail, and
the pair of first raceway grooves extending parallel to each other in the longitudinal direction are provided on an outside diameter surface of the rail.

14. The linear motion guide unit according to claim 1, wherein
the rail includes a first rail side surface and a second rail side surface extending parallel to each other along the longitudinal direction,
the slider is straddled on the rail,
one of the first raceway grooves is provided on the first rail side surface, and
the other of the first raceway grooves is provided on the second rail side surface.

15. The linear motion guide unit according to claim 1, wherein
the rail is a solid cylindrical splined shaft,
the slider has a hollow cylindrical shape and is arranged on an outer peripheral side of the rail, and
the pair of first raceway grooves extending parallel to each other in the longitudinal direction are provided on an outside diameter surface of the rail.

* * * * *